United States Patent [19]

Williamson

[11] Patent Number: 4,561,505

[45] Date of Patent: Dec. 31, 1985

[54] HINGE MECHANISM FOR FOLDING TOOL BAR ASSEMBLY INCLUDING HOOK ENGAGEABLE OVER PIVOTAL CONNECTION

[75] Inventor: Gerald E. Williamson, Macomb, Ill.

[73] Assignee: Yetter Manufacturing Company, Colchester, Ill.

[21] Appl. No.: 502,489

[22] Filed: Jun. 9, 1983

[51] Int. Cl.[4] .............................................. A01B 73/04
[52] U.S. Cl. ...................................... 172/776; 16/242; 16/347; 74/105; 172/311; 172/446
[58] Field of Search ............... 172/311, 776, 466, 446, 172/456, 662; 403/113, 84, 91; 16/223, 242, 347; 74/105, 520

[56] References Cited

U.S. PATENT DOCUMENTS

| 3,511,319 | 5/1970 | Hansen et al. | 172/662 |
| 3,693,724 | 9/1972 | Fueslein et al. | 172/456 |
| 3,713,495 | 1/1973 | Redford | 172/456 |
| 3,814,191 | 6/1974 | Tilbury | 172/311 |
| 3,944,001 | 3/1976 | Warner et al. | 172/456 |
| 4,061,195 | 12/1977 | Pryor | 172/456 |
| 4,074,766 | 2/1978 | Orthman | 172/311 |
| 4,116,282 | 9/1978 | Hansen | 172/311 |
| 4,133,391 | 1/1979 | Richardson et al. | 172/311 |
| 4,316,511 | 2/1982 | Andersen | 172/776 |
| 4,400,994 | 8/1983 | Skjaeveland | 16/242 X |
| 4,453,601 | 6/1984 | Orthman et al. | 172/776 X |

Primary Examiner—Richard T. Stouffer
Attorney, Agent, or Firm—McWilliams, Mann, Zummer and Sweeney

[57] ABSTRACT

This invention relates to a folding tool bar assembly having a central tool bar structure and wing members hingedly mounted adjacent opposite ends thereof, with hinge mechanism pivotally connecting the respective wing members to the structure for movement between extended positions beyond the structure ends and folded positions overlying the central structure and including locking hooks to prevent relative movement of the central structure and wing members when in the operating position.

8 Claims, 5 Drawing Figures

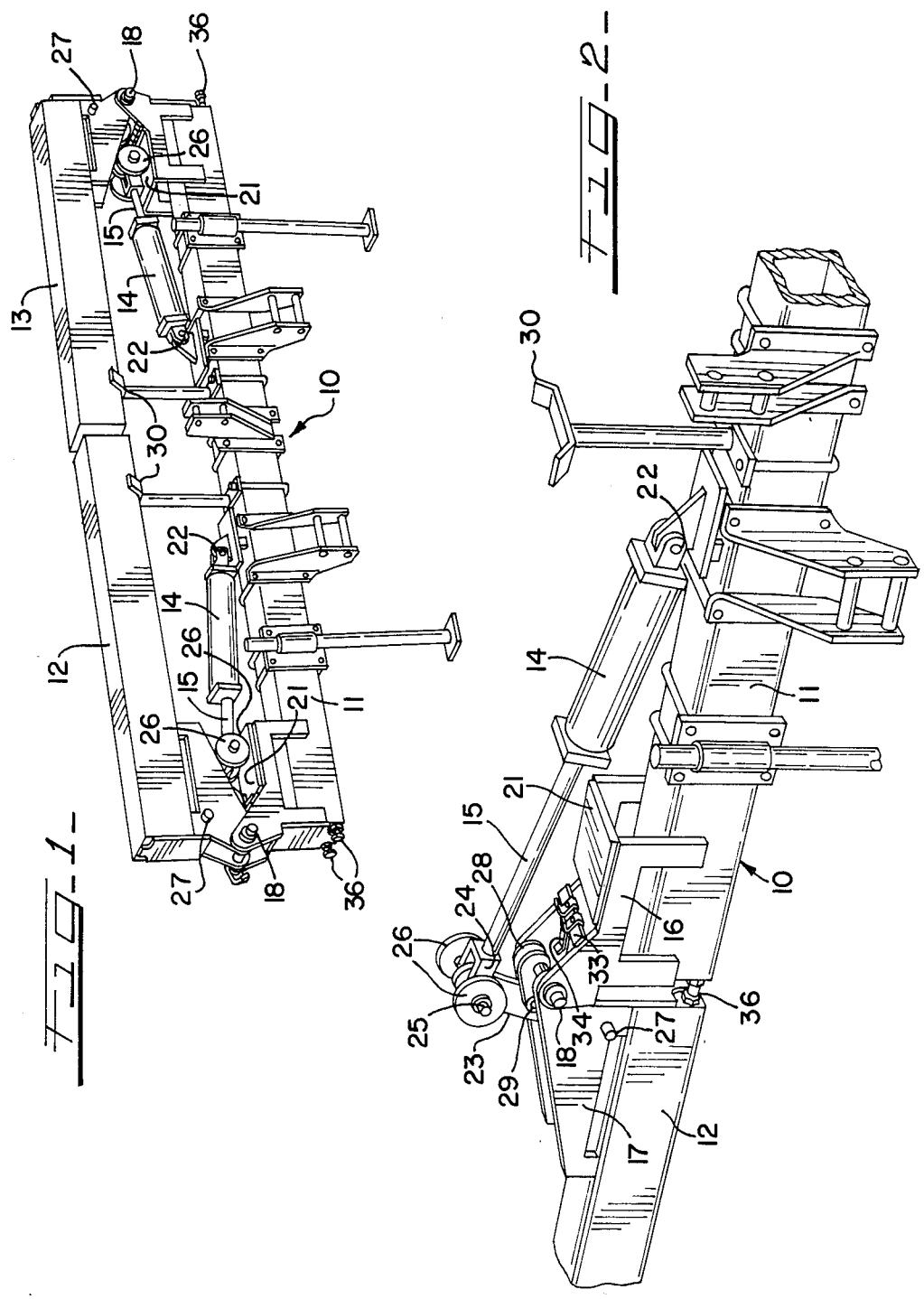

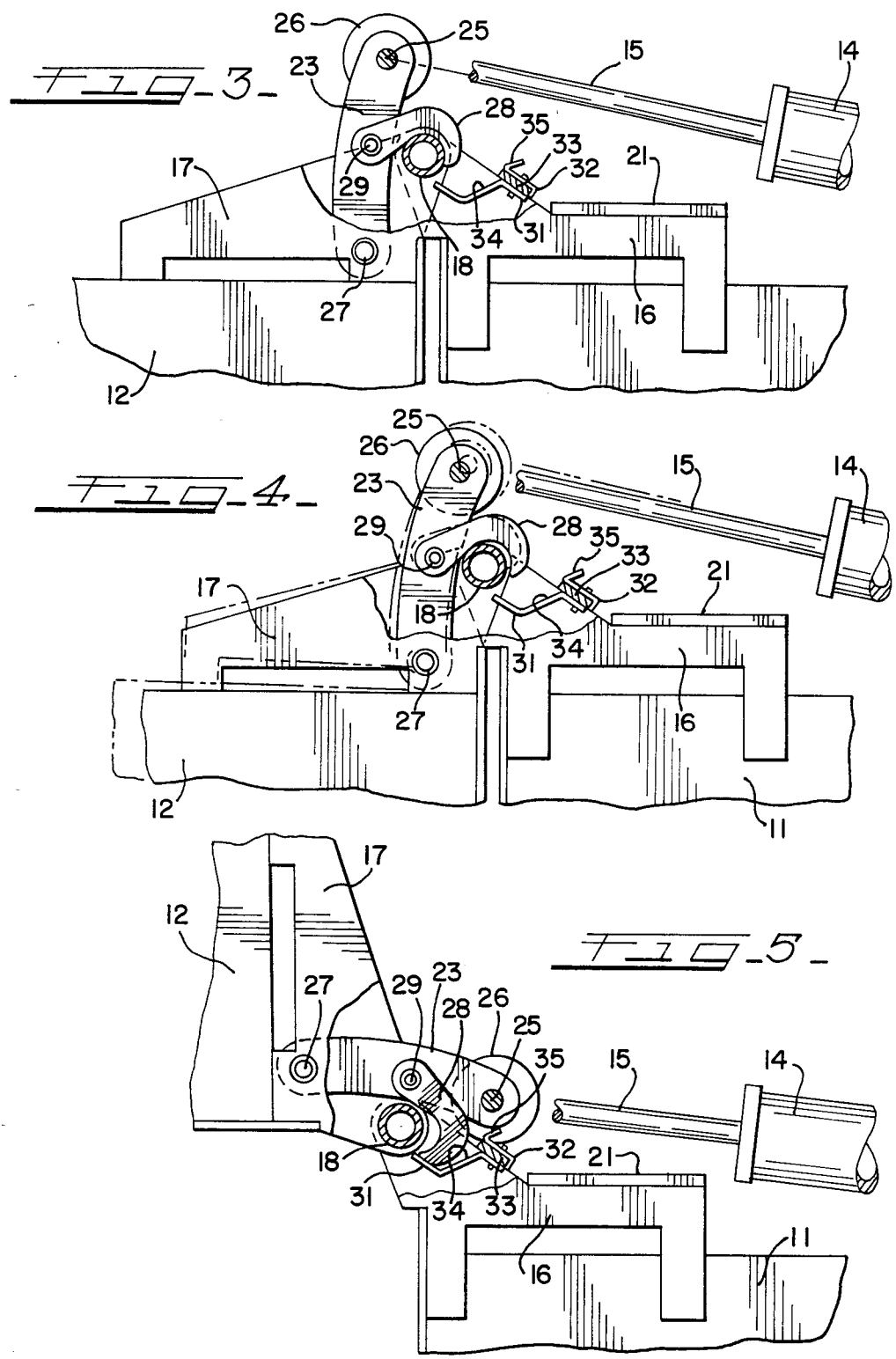

HINGE MECHANISM FOR FOLDING TOOL BAR ASSEMBLY INCLUDING HOOK ENGAGEABLE OVER PIVOTAL CONNECTION

BACKGROUND OF THE INVENTION

1. Field of the Invention:

The invention relates to folding tool bars with hinged wing members which are operable between folded transport positions and extended operative positions.

2. Description of the Prior Art:

The prior art has revealed various folding tool bar arrangements with extensible wings wherein the wing members are operative between two positions, with the wings locked in fully-extended position or locked in a fully-retracted position. Certain of these include lost motion connections to enable some degree of wing movement responsive to ground contours but without provision for locking the wings against such movement.

U.S. Pat. No. 3,693,724 relates to a mechanism for folding and locking disk harrow gangs which utilizes a hinge lock arrangement including a hinge lever 35 with an integrally-formed hook 39 that engages a hinge bracket 25 when the hydraulic cylinder 25 is extended to lock the extension beam 21 in extended position.

U.S. Pat. No. 3,713,495 is for an automatic disk harrow hinge locking device and reveals a hinge locking arrangement for positioning a disk harrow arm and wherein the locking member 32 automatically moves into locked position under the inpetus of a torsion spring 41.

U.S. Pat. No. 4,061,195 covers a lock and lift mechanism for a foldable implement and shows a hinge lock which includes a reciprocating pin 48 to lock the wing in extended position by engaging the pin into the housing 54.

U.S. Pat. No. 4,074,766 relates to a floating folding tool bar having a lock means and includes a lock device to lock a tool bar wing in a vertical position for transport and which includes cooperating lock parts on the wing member and the hydraulic operating cylinder.

U.S. Pat. No. 4,316,511 for an implement frame especially for agricultural machines discloses a lock mechanism to lock a wing in extended position and includes a latch member 9 that is hydraulically actuated about the shaft 10 to move the wing member 3 to its extended position and lock the wing in that position through engagement of the hook 12 with the stop 13.

These patents fail largely because they do not provide mechanism that will lock the wing members in extended positions against movement relative to the central tool bar structure as well as to lock the wings in retracted positions and also provide means for free floating of the wing members in response to terrain contours.

SUMMARY OF THE INVENTION

This invention relates to an agricultural implement foldable tool bar having wing members pivotally secured thereto at opposite ends and movable from retracted positions overlying the tool bar for transport to oppositely-extending positions from the ends of the tool bar to form extensions thereof and where the wings can be locked in horizontal positions rigid with the tool bar or released to enable the wings to float as necessitated by uneven ground conditions. The tool bar assembly includes a central or base tool bar structure and the hingedly-mounted wing members. The wing members are each connected to the base structure by a triangulated hinge mechanism, each of which has a hook device pivotally secured to a hinge lever and engageable with a hing pin to form a rigid triangle between the hook mounting point, the hinge lever mounting point, and the connection point of the hook device on the hinge pin. The wing members are actuated between extended and retracted positions by hydraulic cylinders operatively connected to the triangulated hinge mechanism and when the hydraulic cylinders, which are connected to the hinge lever, are partially retracted, the hook device becomes disengaged from the hinge pin to enable the wing member to have sufficient freedom of movement to float freely over uneven terrain.

DESCRIPTION OF THE DRAWINGS

The purposes of the invention, as embraced by the foregoing, are attained by the folding tool bar and hingedly-connected wing members illustrated in the accompanying drawings wherein:

FIG. 1 is a general perspective view of the basic tool bar structure and hinged wing members shown in the retracted condition overlying the central tool bar structure;

FIG. 2 also is a perspctive view to larger scale with portions broken away and showing the hydraulically-actuated hinge mechanism for one wing member with the wing member in extended position forming a rigid extension of the central tool bar structure;

FIG. 3 is a detail side elevational view of the hinge mechanism with the wing member extended and the hinge parts in locked condition holding the wing member rigidly horizontal under pressure of the hydraulic cylinder;

FIG. 4 also is a detail side elevational view of the hinge mechanism similar to FIG. 3 but indicating the hydraulic cylinder partially retracted so that the hook device is disengaged from the hinge pin sufficiently to enable the wing member to float in response to ground level variations; and FIG. 5 is a detail side elevational view of the hinge mechanism but with the wing member partially retracted to a vertical position and the hinge mechanism released preparatory to movement of the wing member to its full retracted position under impetus of the hydraulic cylinder.

DESCRIPTION OF PREFERRED EMBODIMENT

In the drawings the reference 10 represents a folding tool bar assembly including a central base structure 11 comprising the tool bar base and oppositely-disposed wing members 12 and 13 hingedly mounted adjacent opposite ends of the base member 11 whereby the wing members are movable from the retracted position indicated in FIG. 1 overlying the central base member 11 to extended positions horizontally aligned with the central base member 11 where each wing can be rigidly held by a hydraulic cylinder 14 that is operatively connected with the hinge mechanism by a piston rod 15.

Each of the wing members 12 and 13 is hingedly connected to the central base member 11 and, as best shown in FIGS. 2, 3, and 4, each hinged connection includes a bracket hinge structure 16 on the member 11 and a bracket hinge structure 17 on the respective wing members. The wing members each pivot about a hinge pin 18 which operatively connects the brackets 16 and 17. The bracket structure 16 is provided with a horizontal deck or platform 21.

The hydraulic cylinder 14, as best shown in FIG. 2, is anchored on top of the central section 11 by means of a pivotal connection 22. The operating rod 15 is pivotally connected at its outer end to the upper end of a hinge lever 23 by means of a bifurcated jaw 24 which straddles the lever 23. The hinge lever 23 and the jaw 24 are pivotally connected by an axle 25 (see FIG. 2) that passes through the jaw 24, the lever 23, and a pair of hinge rollers or wheels 26 disposed at respectively outer sides of the jaw 24.

The hinge lever 23 is pivotally mounted in the bracket structure 17 by pin 27. A hook device 28, which may comprise either a single hook or a pair of hooks, and which, for the sake of convenience, will be hereinafter identified simply as hook 28, is pivotally mounted intermediate the ends of lever 23 by pin 29. Hook 28 is adapted to lock over the hinge pin 18 such that when the hydraulic cylinder 14 and piston rod 15 are extended, a rigid triangle is formed in the operating position of the hinge parts. It will be seen that a line from the cylinder anchor 22 passes through the connection to the axle 25 to operate the lever 23, but when the hook 28 is engaged with the pivot pin 18, a rigid triangle is formed between the hook mounting point 29, the hinge lever mounting point 27, and the hinge pin 18 because the side lengths of this triangle are then fixed. This, in turn, fixes the angle from axle 25 to hook mounting point 29 to hinge pin 18, thereby fixing the distance between axle 25 and hinge pin 18. This, in turn, forms a fixed triangle having as its vertices cylinder anchor 22, axle 25, and hinged pin 18, thus fixing the angle formed between the extended hydraulic cylinder, 14 and 15, and the central base section 11. This forms a rigid structure so that the wing member is effectively held in linear position relative to the base section 11, but when the hydraulic pressure is released slightly, as indicated in FIG. 4, the rigid connection is released and the wing 12 is allowed to float.

In the condition of the folding tool bar assembly illustrated in FIG. 1, the wing members 12 and 13 are folded back about the hinge points 18 to overlie the central base section 11 of the tool bar where they rest in saddles 30 mounted on the tool bar section 11. From this position the wing members are each hydraulically actuated by the respectively associated cylinder devices 14. The axle mounted hinge wheels 26 on the end of the piston rod 15 are disposed in engagement with the deck surface 21 of hinge bracket 16 so that when the cylinder 14 is actuated, the piston rod 15 pushes the wheels forward to initiate an upward swinging movement of the wing member about the hinge pin 18. As the wheels 26 continue forward under pressure of the cylinder, they engage upon plate 33 to exert a further force as they move up this portion of bracket 16 to press upwardly on hinge lever 23 and thereby effect a continued lifting force on the bracket 17 to swing the wing member about the pivot 18.

Continued pressure of the piston rod 15 on the hinge lever 23 brings the hook device 28 into engagement with the hinge pin 18 and thereby effect the rigid triangle locking effect when the hinging operation reaches the fully-extended position of the wing member illustrated in FIG. 3 so that the effect of the hook engagement is to act as a wing locking device. In this position the wing member forms an extension of the central base section 11 and is in linear relation thereto in which position the wing member is maintained by the rigid condition of the hinge mechanism under hydraulic pressure of the cylinder 14. This rigid positioning of the wing member can be relieved when desired, merely by partially releasing the hydraulic pressure in cylinder 14 to a slight extent so that the hinge lever 23 and the wing locking hook 28 assumes the position illustrated in FIG. 4, whereupon the wing member is free to float, to the extent of about five degrees, about the hinge pivot 18 so that the wing can move up and down in response to uneven ground conditions. The horizontal position of the wing members may be adjusted to hold the wings horizontal and in linear alignment with the central base section 11 by means of adjustable nut and lock nut devices 36 disposed between the adjoining ends of the tool bar section 11 and the respective wing members 12 and 13.

In the reverse movement of the wing member toward its retracted position, the piston rod 15, by its connection to the end of the hinge lever 23, pulls the lever inwardly and causes it to bear against the hinge pin 18, whereupon continued movement causes the lever to fulcrum about the hinge pin and thereby effect the upward swinging movement of the wing member about the hinge pivot until it reaches a vertical position, as shown in FIG. 5, and at this point the pull of the piston rod on the lever 23 is in a generally linear direction so that the wing member moves over the dead center position and is enabled to continue its movement to the fully-retracted position of FIG. 1.

Also shown in FIG. 5 is a means for guiding the wing locking hook 28 as the mechanism moves to the fully-retracted position so that it does not come into contact with the front edge of the deck 21 and interfere with the operation of the hinge mechanism. It will be seen that during the retracting movement when the point is reached where the hook 28 drops over the hinge pin 18, the hook 28 is disengaged from hinge pin 18 by guide member 31.

Guide member 32 is provided to prevent the wing locking hook 28 from dropping onto deck plate 21. Guide members 31 and 32 are mounted on a plate 33 mounted on hinge bracket 16, and each is provided with a sloping guide surface to lead the hook over the bridge member 33 so that it will come to rest on guide member 32. The guide member 31 includes an inclined surface 34 which is engaged by the leading edge of the hook and guided upwardly and over the bridge 33 as the hinge lever 23 is propelled rearwardly by the piston rod 15. The guide member 32 includes an inclined surface 35 that in effect forms a continuation of the inclination 34 so that the hook is guided clear of obstructions as the wing member is pulled to its final position overlying the tool bar section 11.

From the foregoing, it can be seen that a folding tool bar assembly has been provided which is equipped with hingedly mounted end wing members and wherein the wing members may be prevented from floating upwardly under some operating conditions when the wings can be locked in horizontal position linearly aligned with the main tool bar section. However, the wings may be released under other conditions to float according to uneven ground conditions simply by reducing a hydraulic operating pressure, and this is readily controlled from an operator's seat on a hauling tractor whereby the operator may either lock the wing members in their linear positions relative to the central tool bar section or back off the hydraulic pressure slightly to enable the wings to float.

The entire wing locking mechanism consisting of the hook device 28, and parts 29, 31, 32, and associated hardware can either be installed on newly manufactured agricultural implements, or it can be retrofitted to existing equipment in the field and actually is made up in kit form for this purpose.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A folding tool bar assembly including a linearly-extending base member adapted to be attached to a towing vehicle; at least one wing member hingedly attached to said base member operative to assume either a non-operative transport position overlying and generally parallel to said base member or an operative position linearly extending from said base member; a hinge mechanism connecting said base member and said wing member with a pair of interfitting brackets and a hinged pin; hydraulic actuating means connected between said wing member and said base member for movement of said wing member between the operative and non-operative positions; a hinge lever connected at one end to said wing member and at its other end to said hydraulic actuating means; and a hook pivotally mounted on said hinge lever engageable with said hinge pin when said wing member is in its fully-extended position whereby when said hydraulic actuating means is fully extended and said hook engages said hinge pin, said wing member is fixed against rotation about said hinge pin and locked in its operative position.

2. A folding tool bar assembly as in claim 1 wherein a reduction in hydraulic pressure in said hydraulic actuating means will release said hook from engagement with said hinge pin and thereby enable the wing member to float in accordance with uneven ground conditions.

3. A folding tool bar assembly as in claim 1 wherein said hinge mechanism includes a first bracket affixed to said base member defining a generally horizontal deck plate and a ramp inclined upwardly therefrom.

4. A folding tool bar assembly as in claim 3 wherein said first hinge bracket includes at least one guide surface to disengage said hook from said hinge pin during retracting movements.

5. A folding tool bar assembly as in claim 3 wherein said first hinge bracket includes at least one guide surface to guide said hook clear of said deck plate during retracting movements.

6. A hinge mechanism for a folding tool bar assembly including first and second hinge brackets, a hinge pin pivotally connecting said hinge brackets, a hydraulic cylinder and operating rod for actuating said hinge brackets between retracted and extended positions, a pair of roller wheels on said operating rod, a hinge lever having one end pivotally mounted to the second hinge bracket, and another end pivotally mounted to said operating rod, and a hook mechanism pivotally mounted to said hinge lever intermediate said one end and said another end and engageable over said hinge pin.

7. A hinge mechanism for a folding tool bar assembly as set forth in claim 6 wherein the connection of said hook mechanism to said hinge pin when said hook mechanism is engaged with said hinge pin, the pivotal mounting of said hook mechanism intermediate the ends of the hinge lever, and the pivotal mounting of the hinge lever by the second hinge bracket form a rigid triangle in the extended position under the pressure of said hydraulic cylinders, said rigid triangle being releasable by a reduction in hydraulic pressure in said cylinder.

8. In a folding tool bar hinge assembly including a base member having a base hinge bracket, a wing member having a wing hinge bracket, a pivotal connection between said base and wing hinge brackets, a hydraulic actuating means mounted above said base member and connected between said wing member and said base member by a link member to extend and retract said wing member with respect to said base member; a wing locking kit comprising at least one hook pivotally connectable with said link member and engageable with said pivotal connection and at least one guide member having at least one bend forming a sloping guide surface for said hook and attachable to said base hinge bracket to guide said hook upon disengagement from said pivotal connection.

* * * * *